US012644227B2

(12) United States Patent
Wang et al.

(10) Patent No.: US 12,644,227 B2
(45) Date of Patent: Jun. 2, 2026

(54) WATERLESS DIGITAL PRINTING METHOD

(71) Applicants: Hangzhou Boyang New Material Technology Co., Ltd., Hangzhou City (CN); Hangzhou Wensli Silk Digital Printing Co., Ltd., Hangzhou City (CN); Hangzhou Wensli Silk Sciences & Techniques Co., Ltd., Hangzhou City (CN); Zhejiang Sci-Tech University, Hangzhou City (CN)

(72) Inventors: Yihan Wang, Hangzhou City (CN); Zhaomei Xu, Hangzhou City (CN); Tingfang Ma, Hangzhou City (CN); Jianhua Li, Hangzhou City (CN)

(73) Assignees: Hangzhou Boyang New material Technology Co, Ltd., Hangzhou City (CN); Hangzhou Wensli Silk Digital Printing Co., Ltd., Hangzhou City (CN); Hangzhou Wensli Silk Sciences & Technologies Co., Ltd., Hangzhou City (CN); Zhejiang Sci-Tech University, Hangzhou City (CN)

( * ) Notice: Subject to any disclaimer, the term of this patent is extended or adjusted under 35 U.S.C. 154(b) by 225 days.

(21) Appl. No.: 18/756,891

(22) Filed: Jun. 27, 2024

(65) Prior Publication Data

US 2025/0066998 A1 Feb. 27, 2025

(30) Foreign Application Priority Data

Aug. 23, 2023 (CN) ......................... 202311065760.6

(51) Int. Cl.

| | |
|---|---|
| ***D06P 5/30*** | (2006.01) |
| ***B41J 3/407*** | (2006.01) |
| ***B41J 11/00*** | (2006.01) |

(52) U.S. Cl.

CPC ............... *D06P 5/30* (2013.01); *B41J 3/4078* (2013.01); *B41J 11/00244* (2021.01)

(58) Field of Classification Search

CPC ....... D06P 5/30; B41J 3/4078; B41J 11/00244

See application file for complete search history.

(56) References Cited

U.S. PATENT DOCUMENTS

2009/0237431 A1* 9/2009 Yan ........................... D06P 5/30 347/9

FOREIGN PATENT DOCUMENTS

CN 103993491 A 8/2014
CN 203995135 U 12/2014

(Continued)

OTHER PUBLICATIONS

"Chinese Application No. 202311065760.6, Chinese Search Report dated Oct. 8, 2023", (Oct. 8, 2023), 2 pgs.

(Continued)

*Primary Examiner* — Bradley W Thies

(74) *Attorney, Agent, or Firm* — Schwegman Lundberg & Woessner, P.A.

(57) ABSTRACT

The disclosure relates to the technical field of fabric printing, in particular to a waterless digital printing method, which includes: scanning and detecting a surface to be printed of a target fabric and determining a first type hydrophilic detection point and a second type hydrophilic detection point of the target fabric according to a yarn type; performing a primary hydrophilic detection on the first type hydrophilic detection point and the second type hydrophilic detection point and calculating a hydrophilicity stability parameter; determining a fabric preheating mode according to the hydrophilicity stability parameter, the fabric preheating mode including differential temperature preheating and uniform temperature preheating; performing digital ink-jet (Continued)

printing on the target fabric by a digital printing device when preheating is completed; and performing drying and curing in which the printed target fabric is placed into a drying chamber for heating and curing.

10 Claims, 3 Drawing Sheets

(56) References Cited

FOREIGN PATENT DOCUMENTS

| | | | |
|---|---|---|---|
| CN | 105603788 | A | 5/2016 |
| CN | 107284029 | A | 10/2017 |
| CN | 109572238 | A | 4/2019 |
| CN | 216610584 | U | 5/2022 |

OTHER PUBLICATIONS

"Chinese Application No. 202311065760.6, First Office Action issued Oct. 8, 2023", (Oct. 8, 2023), 4 pgs.

"Chinese Application No. 202311065760.6, Notification to Grant Patent Right for Invention issued Oct. 19, 2023", (Oct. 19, 2023), 2 pgs.

* cited by examiner

WATERLESS DIGITAL PRINTING METHOD

CROSS REFERENCE TO THE RELATED APPLICATIONS

This Non-provisional application claims priority under 35 U.S.C. § 119 (a) to Chinese Patent Application No. CN202311065760.6 filed on Aug. 23, 2023, the entire contents of which is hereby incorporated by reference.

TECHNICAL FIELD

The disclosure relates to the technical field of fabric printing, in particular to a waterless digital printing method.

BACKGROUND ART

Digital printing is that a pattern is input into a computer in a digital form and is edited and processed by a computer printing color-separation pattern-designing system, and then a computer controls a micro-piezoelectric ink jet mouth to directly spray a special dye solution on a textile so as to form a required pattern. In a conventional process, the ink may flush along fibers after the ink is jet printed on fabric due to characteristics of ordinary fabric, which blurs a jet printed pattern. Therefore, sizing is required on the fabric before printing to solve a problem of color flushing of a digital jet printed pattern, and washing is required to remove the sizing after printing. This washing process causes a lot of waste water with residual dye solutions, and if heating is added, more energy is wasted. Additionally, soaping is required after washing, which is time-consuming, material-consuming, water-wasting and energy-wasting.

A digital printing machine is disclosed in Chinese patent publication No. CN107284029A, in which a heating device connected with a main control terminal is provided on an ink jet head, a thermal lighting device is further provided on a printing machine body, and a drying device is further provided on the printing machine body; the printing machine body is further provided with a preheating device, and a fabric detection device is further provided at a side of the printing machine away from a workbench, and the fabric detection device is configured to detect a fabric and outputs a fabric detection signal to the main control terminal, and the main control terminal controls the preheating device, the thermal lighting device, the heating device and the drying device to start. A digital printing machine according to the disclosure heats the ink jet head so as to increase a temperature of an ink, thus making the temperature of the ink more uniform and reducing image breakage. It can be seen that the above technical scheme has following problems: influence of actual fabric hydrophilicity on absorption capacity of ink-jet dyes is not considered, and the temperature of the ink cannot be accurately controlled, resulting in poor printing effect.

SUMMARY

Thus, a waterless digital printing method is provided in the disclosure so as to solve a problem of poor digital printing in related art caused by a fact that fabric pretreatment parameters cannot be correspondingly adjusted according to actual dye absorption capacity of a fabric.

In order to achieve the above object, the present disclosure provides a waterless digital printing method, which includes:

- scanning and detecting a surface to be printed of a target fabric and determining a first type hydrophilic detection point and a second type hydrophilic detection point of the target fabric according to a yarn type, by a visual analysis device;
- performing a primary hydrophilic detection on the first type hydrophilic detection point and the second type hydrophilic detection point, by a hydrophilic detection device, and calculating a hydrophilicity stability parameter;
- comparing the hydrophilicity stability parameter with a preset hydrophilicity stability parameter to determine a fabric preheating mode, the fabric preheating mode comprising differential temperature preheating and uniform temperature preheating;
- recording a first type hydrophilic detection point and a second type hydrophilic detection point corresponding to contact angles larger than a preset reference contact angle as hydrophobic points and determining preheating temperatures for different regions of the target fabric according to a number and distribution of the hydrophobic points, by a data analysis device in differential temperature preheating;
- determining a preheating temperature in the uniform temperature preheating mode according to a hydrophilic speed of the target fabric, by the data analysis device in the uniform temperature preheating;
- performing digital ink-jet printing on the target fabric when preheating is completed, by a digital printing device; and
- performing drying and curing in which the printed target fabric is placed into a drying chamber for heating and curing.

Further, the visual analysis device is configured to scan and detect the surface to be printed of the target fabric and determine the first type hydrophilic detection point and the second type hydrophilic detection point of the target fabric according to the yarn type, in which

- the first type hydrophilic detection point is a yarn-crossing point, and the second type hydrophilic detection point is a yarn-slit point.

Further, a hydrophilic detection device is configured to perform the primary hydrophilic detection on the first type hydrophilic detection point and the second type hydrophilic detection point and calculate the hydrophilicity stability parameter; in which

- in the primary hydrophilic detection, the hydrophilic detection device drips at a plurality of first type hydrophilic detection points and a plurality of second type hydrophilic detection points using preset hydrophilic detection parameters, and controls the visual analysis device to detect contact angles of droplets corresponding to the plurality of first type hydrophilic detection points and the plurality of second type hydrophilic detection points; and
- the hydrophilicity stability parameter is calculated according to the contact angles of the droplets corresponding to the plurality of first type hydrophilicity detection point and the plurality of second type hydrophilicity detection points.

Further, the data analysis device is configured to compare the hydrophilicity stability parameter with the preset hydrophilicity stability parameter to determine the fabric preheating mode; in which

- if the hydrophilicity stability parameter is smaller than the preset hydrophilicity stability parameter, the data analysis device performs differential temperature preheating on the target fabric according to the contact angles of the first type hydrophilic detection points and the second type hydrophilic detection points; and if the hydrophilicity stability parameter is greater than or equal to the preset hydrophilicity stability parameter, the data analysis device performs uniform temperature preheating on the target fabric according to the hydrophilic speed of the target fabric.

Further, the data analysis device is configured to sequentially compare the contact angles of the first type hydrophilic detection points and the second type hydrophilic detection points with a preset reference contact angle under a first data analysis condition, and record first type hydrophilic detection points and second type hydrophilic detection points corresponding to contact angles larger than the preset reference contact angle as hydrophobic points; and the first data analysis condition is that the hydrophilicity stability parameter is smaller than the preset hydrophilicity stability parameter.

Further, when a proportion of hydrophobic points is greater than a preset proportion of hydrophobic points, the data analysis device correspondingly reduces a fabric tension during hydrophilic detection according to the proportion of hydrophobic points, and the proportion of hydrophobic points is negatively correlated with the fabric tension.

Further, the data analysis device is configured to establish a two-dimensional reference coordinate system for the target fabric under a second data analysis condition, and determine a corresponding preheating temperature according to a number of hydrophobic points in a respective quadrant in the two-dimensional reference coordinate system, the number of hydrophobic points is positively correlated with the preheat temperature; and the second data analysis condition is that confirmation of the hydrophobic point is completed.

Further, the data analysis device is configured to obtain the hydrophilic speed of the target fabric under a third data analysis condition and determine the preheating temperature in the uniform temperature preheating mode according to the hydrophilic speed of the target fabric;

the preheating temperature is negatively correlated with the hydrophilic speed of the target fabric; and the third data analysis condition is that the hydrophilicity stability parameter is greater than or equal to the preset hydrophilicity stability parameter, and the hydrophilic speed of the target fabric is calculated according to hydrophilic speeds of the first type hydrophilicity detection points and the second type hydrophilicity detection points.

Further, the data analysis device correspondingly adjusts dripping amount in the hydrophilic detection according to a speed difference between the hydrophilic speed of the target fabric and the preset hydrophilic speed and performs the hydrophilic detection again when the hydrophilic speed of the target fabric is greater than the preset hydrophilic speed; and increased dripping amount is positively correlated with the speed difference.

Further, the data analysis device is provided with a maximum number of hydrophilic detections, and if a number of hydrophilic detections is greater than a preset number of hydrophilic detections, the data analysis device determines to stop the hydrophilic detection and transmits determination information to an user to remind for artificial fabric processing.

Compared with related art, the disclosure has beneficial effects that in the technical schemes of the disclosure, the visual analysis device is configured to scan and detect the surface to be printed of the target fabric and determine the first type hydrophilic detection point and the second type hydrophilic detection point of the target fabric according to the yarn type, which better indicates hydrophilicity of the target fabric and improves validity of data; in addition, in the technical schemes of the disclosure, the hydrophilicity stability parameter is compared with the preset hydrophilicity stability parameter to determine the fabric preheating mode, so that the preheating treatment of the target fabric is more in line with an actual operation scene, thereby improving preheating effect of the target fabric and further improving digital printing effect of the fabric of the disclosure.

Furthermore, in the disclosure, the data analysis device is configured to establish the two-dimensional reference coordinate system for the target fabric under the second data analysis condition, and determine the corresponding preheating temperature according to the number of hydrophobic points in the respective quadrant in the two-dimensional reference coordinate system, so that the preheating treatment of the fabric is more targeted, and a problem of poor preheating treatment effect caused by uniform preheating is avoided, thereby improving digital printing quality of the disclosure.

Further, in the disclosure, the data analysis device correspondingly adjusts the dripping amount in the hydrophilic detection according to the speed difference between the hydrophilic speed of the target fabric and the preset hydrophilic speed and performs the hydrophilic detection again when the hydrophilic speed of the target fabric is greater than the preset hydrophilic speed, so that an overlarge error of a detection result caused by a small dripping amount is avoided, thereby improving digital printing quality of the disclosure.

DETAILED DESCRIPTION

Figure 1:
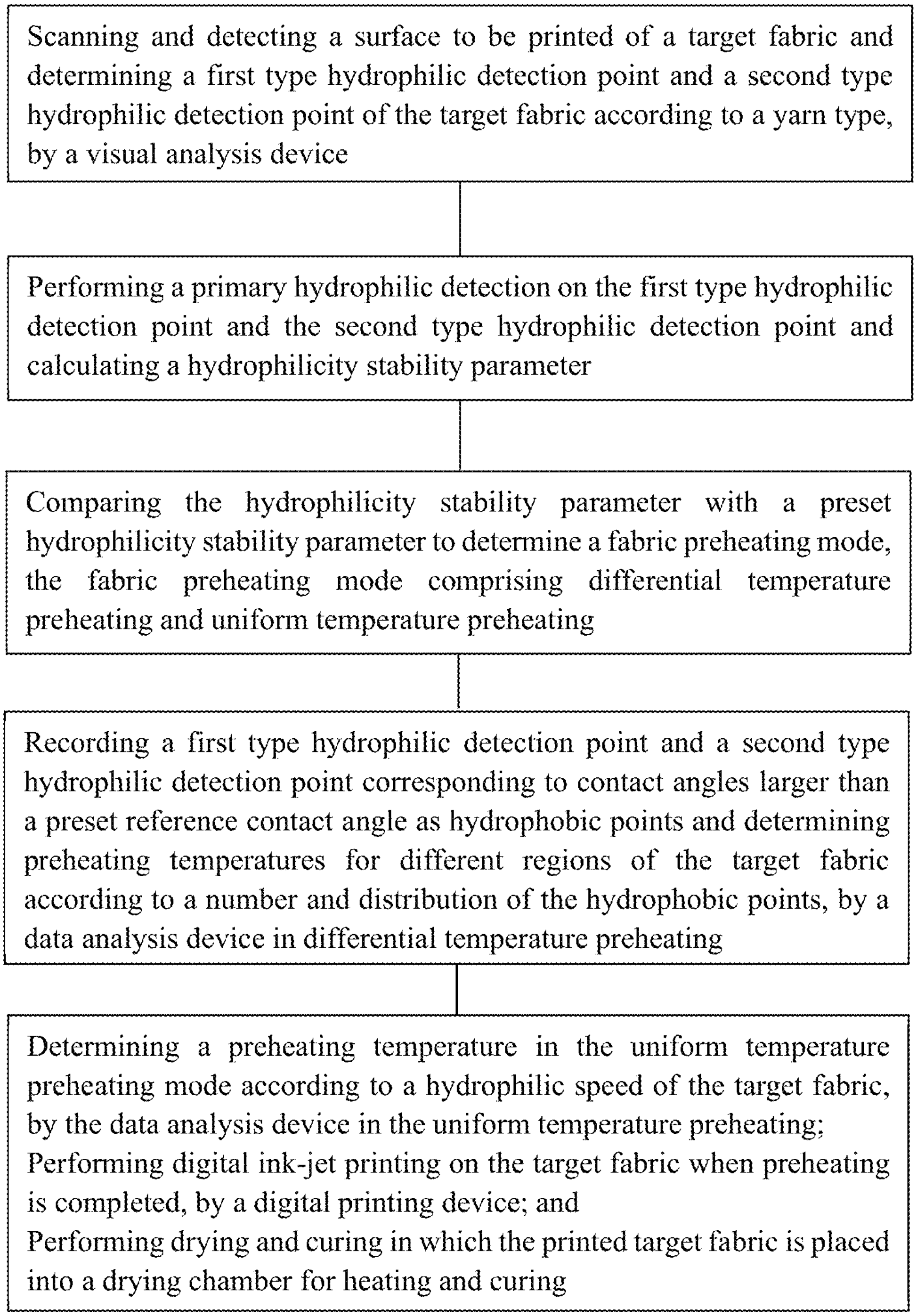
FIG. 1 is a schematic view of a waterless digital printing method according to an embodiment of the present disclosure.

Preferred embodiments of the present disclosure will be described below with reference to the accompanying drawings. It should be understood by those skilled in the art that these embodiments are only used to explain technical principles of the present disclosure, and are not intended to limit the protection scope of the present disclosure.

It should be noted that in description of the present disclosure, terms such as “upper”, “lower”, “left”, “right”, “inner” and “outer” which indicate a directional or positional relationship are based on the directional or positional relationship shown in the drawings, and are merely for convenience of description, rather than indicate or imply that the device or element described must have a specific orientation, be configured and operated in a specific orientation, and thus cannot be understood as a limitation on the present disclosure.

In addition, it should be noted that in the description of the present disclosure, unless otherwise specified and limited, the terms “installing”, “coupling” and “connecting” should be understood in a broad sense, for example, it can be “fixedly connecting”, or “detachably connecting” or “integrally connecting”, or it can be “mechanically connecting” or “electrically connecting”, or it can be “directly connecting” or “indirectly connecting through an intermediate medium”, or it can be “communicating within two elements”. For those skilled in the art, specific meanings of the above terms in the present disclosure can be understood according to specific situations.

Figure 2:
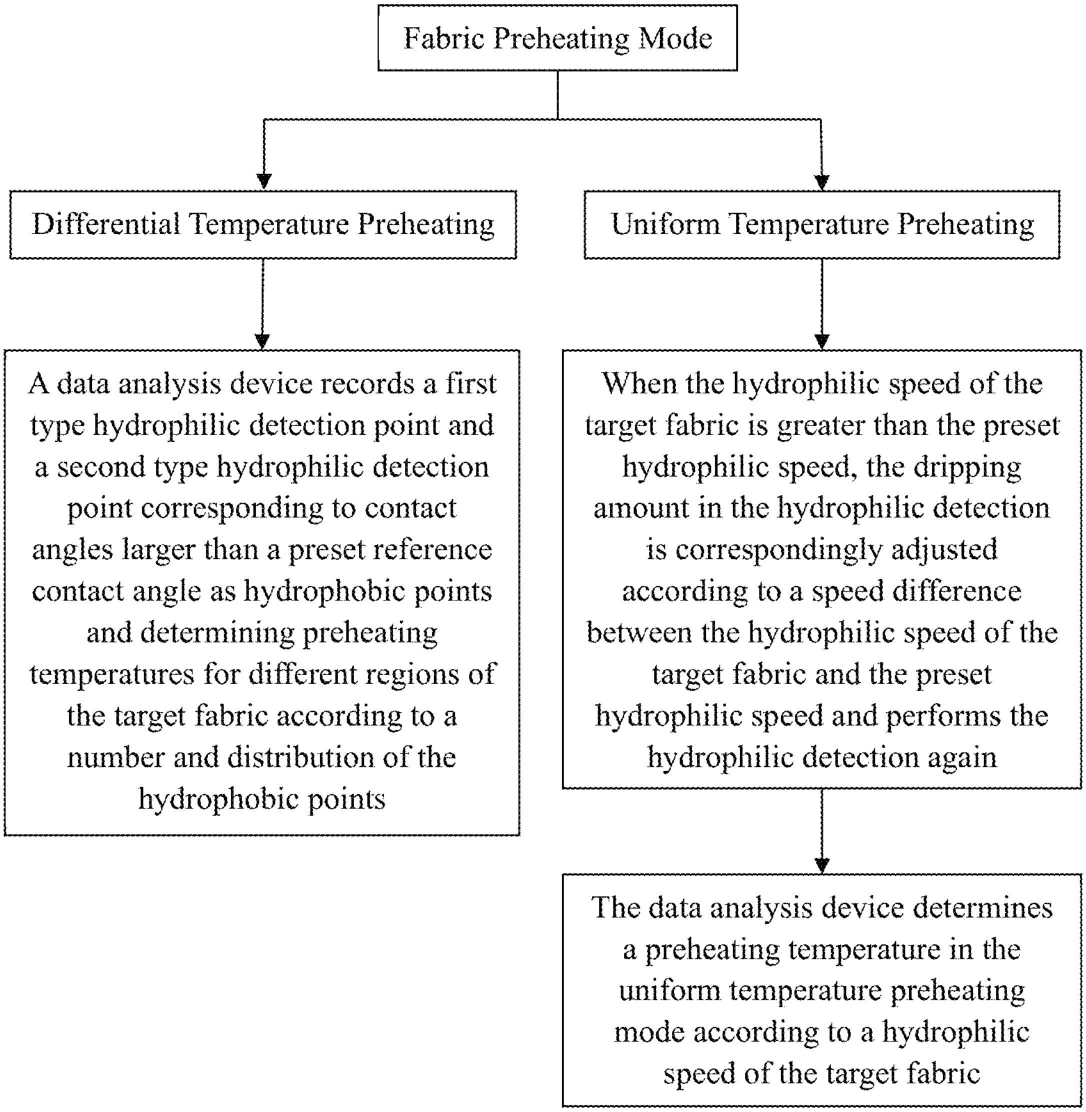
FIG. 2 is a schematic view of the fabric preheating mode in the embodiment of the present disclosure.
Figure 3:
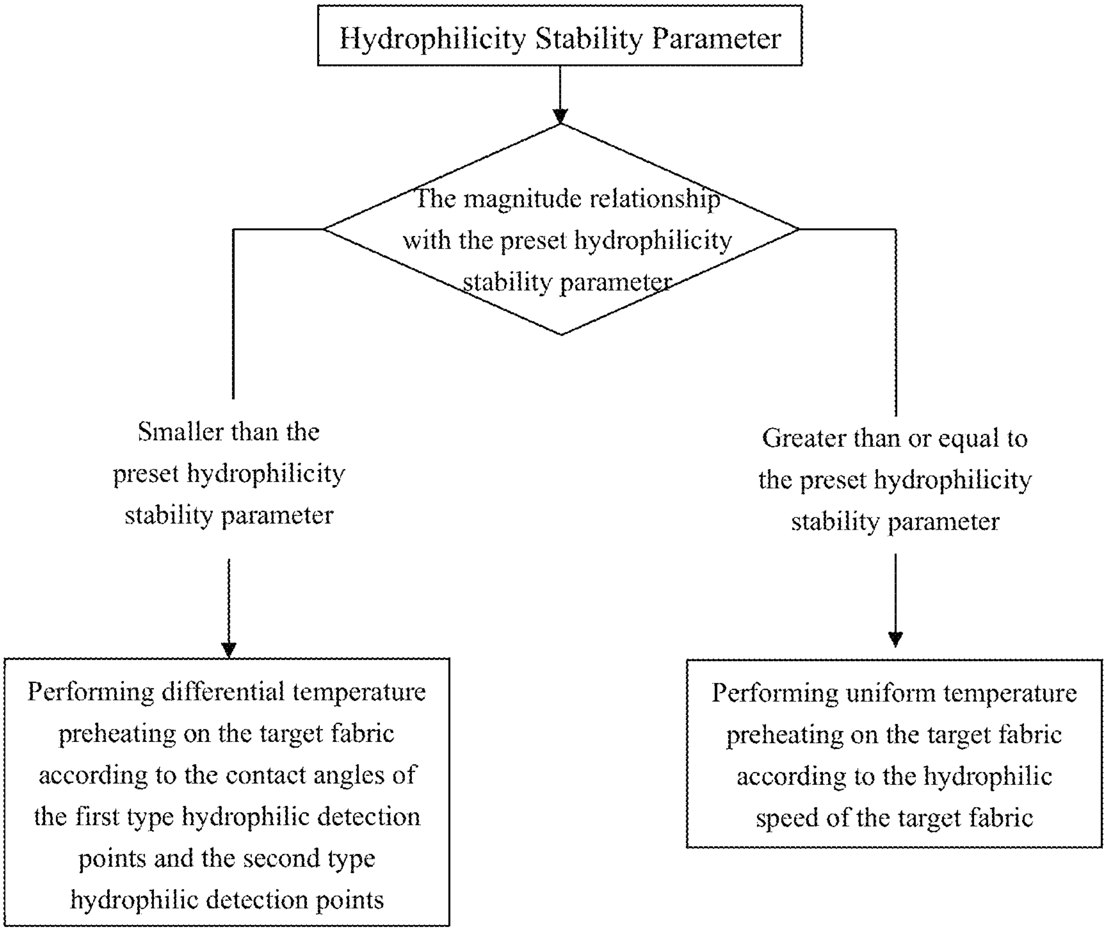
FIG. 3 is a flow chart of comparing a hydrophilicity stability parameter with a preset hydrophilicity stability parameter to determine a fabric preheating mode according to an embodiment of the present disclosure.

Referring to FIGS. 1 to 3, the disclosure provides a waterless digital printing method, which includes:

- scanning and detecting a surface to be printed of a target fabric and determining a first type hydrophilic detection point and a second type hydrophilic detection point of the target fabric according to a yarn type, by a visual analysis device;
- performing a primary hydrophilic detection on the first type hydrophilic detection point and the second type hydrophilic detection point, by a hydrophilic detection device, and calculating a hydrophilicity stability parameter;
- comparing the hydrophilicity stability parameter with a preset hydrophilicity stability parameter to determine a fabric preheating mode, the fabric preheating mode comprising differential temperature preheating and uniform temperature preheating;
- recording a first type hydrophilic detection point and a second type hydrophilic detection point corresponding to contact angles larger than a preset reference contact angle as hydrophobic points and determining preheating temperatures for different regions of the target fabric according to a number and distribution of the hydrophobic points, by a data analysis device in differential temperature preheating;
- determining a preheating temperature in the uniform temperature preheating mode according to a hydrophilic speed of the target fabric, by the data analysis device in the uniform temperature preheating;
- performing digital ink-jet printing on the target fabric when preheating is completed, by a digital printing device; and
- performing drying and curing in which the printed target fabric is placed into a drying chamber for heating and curing.

Specifically, the target fabric is a fabric sample that needs to be printed, and an area and a thickness of the target fabric are determined according to an actual operation scene.

Specifically, the fabric can be preheated by a hot press with adjustable temperature and pressure, which can uniformly transfer heat and pressure to the fabric so as to ensure that a pattern can be firmly attached to the fabric in a subsequent printing process. In addition, if large-scale fabric printing preheating is needed, a continuous heat transfer machine can be considered to be used, which can continuously process a large number of fabrics, thus improving production efficiency. A user can determine a device used for fabric preheating according to the actual operation scene, which is well known for the skilled in the art and is not described herein again.

Specifically, digital printing is that a pattern is input into a computer in a digital form and is edited and processed by a computer printing color-separation pattern-designing system, and then a computer controls an ink jet mouth to directly spray a special dye solution on a textile so as to form a required pattern. The visual analysis device is used to capture and digitize fabric or pattern images through a camera or image scanner, and then analyze and process the image data through image processing software in a processor. A data analysis device is a processor or a controller that receives and processes and analyzes pattern data. The digital printing device is an ink supply device such as a nozzle or an ink jet mouth, which jets ink onto the fabric to form a pattern.

Specifically, the hydrophilic detection device can adopt a contact angle meter for measuring a contact angle between the surface of the target fabric and a droplet. The contact angle meter is composed of a micro syringe, a microscope and a dial. When in use, the droplet is first dropped on a solid surface, then a contact condition between the droplet and the solid surface is observed through the microscope, and finally a contact angle value is read through the dial. The droplet can be a dye to be printed on the target fabric. It is noted that specific selection of the droplet can be determined according to the actual operation scene.

Specifically, the visual analysis device is configured to scan and detect the surface to be printed of the target fabric and determine the first type hydrophilic detection point and the second type hydrophilic detection point of the target fabric according to the yarn type, in which

- the first type hydrophilic detection point is a yarn-crossing point, and the second type hydrophilic detection point is a yarn-slit point.

Specifically, hydrophilicity at the yarn-crossing point is relatively small because at a crossing point of the fabric, yarns interweave together to form a compact structure, which may limit infiltration of water; and hydrophilicity at a fabric slit is relatively large because there are certain gaps between fibers of the fabric at the slit, which can penetrate water, and because a contact area between the yarn and the fabric is small, which also causes hydrophilicity at the slit to be relatively high, and thus the yarn-crossing point is selected as the first type hydrophilic detection point and the yarn-slit point is selected as the second type hydrophilic detection point.

Specifically, the hydrophilic detection device is configured to perform the primary hydrophilic detection on the first type hydrophilic detection point and the second type hydrophilic detection point and calculate the hydrophilicity stability parameter; in which

- in the primary hydrophilic detection, the hydrophilic detection device drips at a plurality of first type hydrophilic detection points and a plurality of second type hydrophilic detection points using preset hydrophilic detection parameters, and controls the visual analysis device to detect contact angles of droplets corresponding to the plurality of first type hydrophilic detection points and the plurality of second type hydrophilic detection points; and
- the hydrophilicity stability parameter is calculated according to the contact angles of the droplets corresponding to the plurality of first type hydrophilicity detection point and the plurality of second type hydrophilicity detection points.

Specifically, the hydrophilicity stability parameter is S, and a calculation formula of S is:

$$S = \frac{\sum_{i-1}^{n} \sqrt{(Zi - Zw)}}{n}$$

where Zi indicates an i-th contact angle, Zw indicates a calculated average value of all contact angles, and i=1, 2, 3, . . . , n, n indicates a total number of contact angles of droplets corresponding to the plurality of first type hydrophilic detection points and the plurality of second type hydrophilic detection points.

Specifically, the data analysis device is configured to compare the hydrophilicity stability parameter with the preset hydrophilicity stability parameter to determine the fabric preheating mode; in which if the hydrophilicity stability parameter is smaller than the preset hydrophilicity stability parameter, the data analysis device performs differential temperature preheating on the target fabric according to the contact angles of the first type hydrophilic detection points and the second type hydrophilic detection points; and if the hydrophilicity stability parameter is greater than or equal to the preset hydrophilicity stability parameter, the data analysis device performs uniform temperature preheating on the target fabric according to the hydrophilic speed of the target fabric.

As an implementable mode, a determination process described above can be transformed that a preset hydrophilicity stability parameter S0 is provided, $0<S0$, If S is smaller than S0, the data analysis device performs differential temperature preheating on the target fabric according to the contact angles of the first type hydrophilic detection points and the second type hydrophilic detection points.

If S is larger than or equal to S0, the data analysis device performs uniform temperature preheating on the target fabric according to the hydrophilic speed of the target fabric.

Specifically, a value of the preset hydrophilic stability parameter can be obtained by the user according to experiments and historical data, that is, hydrophilic stability parameters of different fabrics can be determined by the user under a premise that printing effect meets user requirements through variable-controlled experiments, and are recorded as the preset hydrophilic stability parameters, and a specific value of the preset hydrophilic stability parameter can be determined by the user according to the actual operation scene.

Specifically, the data analysis device is configured to sequentially compare the contact angles of the first type hydrophilic detection points and the second type hydrophilic detection points with a preset reference contact angle under a first data analysis condition, and record first type hydrophilic detection points and second type hydrophilic detection points corresponding to contact angles larger than the preset reference contact angle as hydrophobic points; and the first data analysis condition is that the hydrophilicity stability parameter is smaller than the preset hydrophilicity stability parameter.

As an implementable mode, a determination process described above can be transformed that a preset reference contact angle is R0, a contact angle of the first type hydrophilic detection point is R1, and a contact angle of the second type hydrophilic detection point is R2, $0<R0$;

If R1 is larger than R0, the data analysis device determines that a first type of hydrophilic detection point corresponding to R1 is recorded as a hydrophobic point.

If R2 is larger than R0, the data analysis device determines that a second type hydrophilic detection point corresponding to R2 is recorded as a hydrophobic point.

Specifically, the smaller the contact angle, the easier it is for the fabric surface to be wetted by liquid, indicating the fabric surface has good hydrophilicity; contrariwise, the larger the contact angle, the more difficult it is for the fabric surface to be wetted by liquid, and the fabric surface has poor hydrophilicity. A value of the preset reference contact angle can be determined according to an actual application scene, but it should be guaranteed that the preset reference contact angle should be less than 90°, and with a feasible value provided, the preset reference contact angle can be 80°.

Specifically, when a proportion of hydrophobic points is greater than a preset proportion of hydrophobic points, the data analysis device correspondingly reduces a fabric tension during hydrophilic detection according to the proportion of hydrophobic points, and the proportion of hydrophobic points is negatively correlated with the fabric tension.

Specifically, a value of the preset proportion of hydrophobic points can be determined by the user according to experiments and historical printing data, that is, a maximum proportion of hydrophobic points satisfying user requirements can be determined according to fabric printing effect under different proportions of hydrophobic points and recorded as the preset proportion of hydrophobic points by the user, and the proportion of hydrophobic points is a proportion of a number of hydrophobic points to a total number of the first type hydrophilic detection points and the second type hydrophilic detection points.

Specifically, the data analysis device is configured to establish a two-dimensional reference coordinate system for the target fabric under a second data analysis condition, and determine a corresponding preheating temperature according to a number of hydrophobic points in a respective quadrant in the two-dimensional reference coordinate system, the number of hydrophobic points is positively correlated with the preheat temperature; and the second data analysis condition is that confirmation of the hydrophobic point is completed.

As an implementable mode, a determination process described above can be transformed into that a number of hydrophobic points in a i-th quadrant is Ni, i=1, 2, 3, 4, and a preheating temperature is T, which is set as $T=T0\times Ni/N0$, where T0 indicates a preset initial preheating temperature, $0<T0$, N0 indicates the preset number of hydrophobic points, $0<N0$. A value of N0 can be taken by the user as an average value of numbers of hydrophobic points in a single quadrant of a record among historical printing records corresponding to a fabric whose printing quality meets user requirements, and the average value is recorded as the preset number of hydrophobic points.

Specifically, the two-dimensional reference coordinate system is established with a center point of an area of the target fabric to be printed as an origin, and areas of respective quadrants are the same.

Specifically, the data analysis device is configured to obtain the hydrophilic speed of the target fabric under a third data analysis condition and determine the preheating temperature in the uniform temperature preheating mode according to the hydrophilic speed of the target fabric;

the preheating temperature is negatively correlated with the hydrophilic speed of the target fabric; and the third data analysis condition is that the hydrophilicity stability parameter is greater than or equal to the preset hydrophilicity stability parameter, and the hydrophilic speed of the target fabric is calculated according to hydrophilic speeds of the first type hydrophilicity detection points and the second type hydrophilicity detection points.

The hydrophilic speed of the target fabric is an average value of hydrophilic speeds of the first type hydrophilic detection points and the second type hydrophilic detection points, and the hydrophilic speeds of the first type hydrophilic detection points and the second type hydrophilic detection points can be a speed at which the target fabric absorbs droplets per device time.

As an implementable model, a determination process described above can be transformed as follows.

Specifically, the data analysis device correspondingly adjusts dripping amount in the hydrophilic detection according to a speed difference between the hydrophilic speed of the target fabric and the preset hydrophilic speed and performs the hydrophilic detection again when the hydrophilic speed of the target fabric is greater than the preset hydrophilic speed; and increased dripping amount is positively correlated with the speed difference.

Specifically, a value of the preset hydrophilic speed can be determined by the user according to the actual application scene, that is, a hydrophilic speed satisfying the user requirements can be determined according to printing effect of the target fabric at different hydrophilic speeds and recorded as the preset hydrophilic speed by the user.

Specifically, the data analysis device is provided with a maximum number of hydrophilic detections, and if a number of hydrophilic detections is greater than a preset number of hydrophilic detections, the data analysis device determines to stop the hydrophilic detection and transmits determination information to a user to remind for artificial fabric processing.

Embodiment: In this embodiment, a device used for preheating the target fabric is a hot press, a hydrophilic detection device is a contact angle meter, a material of the target fabric is cotton fabric, and droplets used for hydrophilic detection are of distilled water.

Operation parameters of the data analysis device are set as follows.

A selected number of the first type hydrophilic detection points is 5, and a selected number of the second type hydrophilic detection points is 5.

The preset hydrophilicity stability parameter is 10°.

The preset reference contact angle is 80°.

The proportion of hydrophobic points is 50%.

The preset hydrophilic speed is 3 seconds, and the hydrophilic speed is indicated by time required to completely absorb droplets in hydrophilic detection.

The maximum number of hydrophilic detections is 4.

So far, technical schemes of the present disclosure has been described in connection with preferred embodiments shown in the drawings, but it is easy for those skilled in the art to understand that the protection scope of the present disclosure is obviously not limited to these specific embodiments. Equivalent changes or substitutions can be made to relevant technical features by those skilled in the art without deviating from the principle of the disclosure, and technical schemes after these changes or substitutions falls within the protection scope of the disclosure.

The above is only specific embodiments of the present disclosure, and is not intended to limit this disclosure, and modifications and variations can be made in this disclosure for those skilled in the art. Any modification, equivalent substitution, improvement, etc. made within the spirit and principle of this disclosure shall be encompassed within the protection scope of this disclosure.

What is claimed is:

1. A waterless digital printing method, comprising:

scanning and detecting a surface to be printed of a target fabric and determining a first type hydrophilic detection point and a second type hydrophilic detection point of the target fabric according to a yarn type, by a visual analysis device;

performing a primary hydrophilic detection on the first type hydrophilic detection point and the second type hydrophilic detection point, by a hydrophilic detection device, and calculating a hydrophilicity stability parameter;

comparing the hydrophilicity stability parameter with a preset hydrophilicity stability parameter to determine a fabric preheating mode, the fabric preheating mode comprising differential temperature preheating and uniform temperature preheating;

recording a first type hydrophilic detection point and a second type hydrophilic detection point corresponding to contact angles larger than a preset reference contact angle as hydrophobic points and determining preheating temperatures for different regions of the target fabric according to a number and distribution of the hydrophobic points, by a data analysis device in differential temperature preheating;

determining a preheating temperature in the uniform temperature preheating mode according to a hydrophilic speed of the target fabric, by the data analysis device in the uniform temperature preheating;

performing digital ink-jet printing on the target fabric when preheating is completed, by a digital printing device; and performing drying and curing in which the printed target fabric is placed into a drying chamber for heating and curing.

2. The waterless digital printing method according to claim 1, wherein the visual analysis device is configured to scan and detect the surface to be printed of the target fabric and determine the first type hydrophilic detection point and the second type hydrophilic detection point of the target fabric according to the yarn type, wherein the first type hydrophilic detection point is a yarn-crossing point, and the second type hydrophilic detection point is a yarn-slit point.

3. The waterless digital printing method according to claim 2, wherein the hydrophilic detection device is configured to perform the primary hydrophilic detection on the first type hydrophilic detection point and the second type hydrophilic detection point and calculate the hydrophilicity stability parameter; wherein in the primary hydrophilic detection, the hydrophilic detection device drips at a plurality of first type hydrophilic detection points and a plurality of second type hydrophilic detection points using preset hydrophilic detection parameters, and controls the visual analysis device to detect contact angles of droplets corresponding to the plurality of first type hydrophilic detection points and the plurality of second type hydrophilic detection points; and the hydrophilicity stability parameter is calculated according to the contact angles of the droplets corresponding to the plurality of first type hydrophilicity detection point and the plurality of second type hydrophilicity detection points.

4. The waterless digital printing method according to claim 3, wherein the data analysis device is configured to compare the hydrophilicity stability parameter with the preset hydrophilicity stability parameter to determine the fabric preheating mode; wherein if the hydrophilicity stability parameter is smaller than the preset hydrophilicity stability parameter, the data analysis device performs differential temperature preheating on the target fabric according to the contact angles of the first type hydrophilic detection points and the second type hydrophilic detection points; and if the hydrophilicity stability parameter is greater than or equal to the preset hydrophilicity stability parameter, the data analysis device performs uniform temperature preheating on the target fabric according to the hydrophilic speed of the target fabric.

5. The waterless digital printing method according to claim 4, wherein the data analysis device is configured to sequentially compare the contact angles of the first type hydrophilic detection points and the second type hydrophilic detection points with a preset reference contact angle under a first data analysis condition, and record first type hydrophilic detection points and second type hydrophilic detection points corresponding to contact angles larger than the preset reference contact angle as hydrophobic points; wherein the first data analysis condition is that the hydrophilicity stability parameter is smaller than the preset hydrophilicity stability parameter.

6. The waterless digital printing method according to claim 5, wherein when a proportion of hydrophobic points is greater than a preset proportion of hydrophobic points, the data analysis device correspondingly reduces a fabric tension during hydrophilic detection according to the proportion of hydrophobic points, and the proportion of hydrophobic points is negatively correlated with the fabric tension.

7. The waterless digital printing method according to claim 6, wherein the data analysis device is configured to establish a two-dimensional reference coordinate system for the target fabric under a second data analysis condition, and determine a corresponding preheating temperature according to a number of hydrophobic points in a respective quadrant in the two-dimensional reference coordinate system, the number of hydrophobic points is positively correlated with the preheat temperature; and the second data analysis condition is that confirmation of the hydrophobic point is completed.

8. The waterless digital printing method according to claim 7, wherein the data analysis device is configured to obtain the hydrophilic speed of the target fabric under a third data analysis condition and determine the preheating temperature in the uniform temperature preheating mode according to the hydrophilic speed of the target fabric;

the preheating temperature is negatively correlated with the hydrophilic speed of the target fabric; and the third data analysis condition is that the hydrophilicity stability parameter is greater than or equal to the preset hydrophilicity stability parameter, and the hydrophilic speed of the target fabric is calculated according to hydrophilic speeds of the first type hydrophilicity detection points and the second type hydrophilicity detection points.

9. The waterless digital printing method according to claim 8, wherein the data analysis device correspondingly adjusts dripping amount in the hydrophilic detection according to a speed difference between the hydrophilic speed of the target fabric and the preset hydrophilic speed and performs the hydrophilic detection again when the hydrophilic speed of the target fabric is greater than the preset hydrophilic speed; and increased dripping amount is positively correlated with the speed difference.

10. The waterless digital printing method according to claim 9, wherein the data analysis device is provided with a maximum number of hydrophilic detections, and if a number of hydrophilic detections is greater than a preset number of hydrophilic detections, the data analysis device determines to stop the hydrophilic detection and transmits determination information to an user to remind for artificial fabric processing.

* * * * *